May 11, 1965   R. L. BROWN   3,183,462
SHIELDING MEANS FOR ELECTRICAL APPARATUS
Filed April 10, 1963   2 Sheets-Sheet 1

WITNESSES:
Bernard R. Gieguey
David F. Gould

INVENTOR
Roy L. Brown
BY
F. E. Browder
ATTORNEY

United States Patent Office 3,183,462
Patented May 11, 1965

3,183,462
SHIELDING MEANS FOR ELECTRICAL
APPARATUS
Roy L. Brown, Sharon, Pa., assignor to Westinghouse
Electric Corporation, Pittsburgh, Pa., a corporation of
Pennsylvania
Filed Apr. 10, 1963, Ser. No. 272,077
1 Claim. (Cl. 336—84)

This invention relates in general to electrical transformer windings and more particularly to electrical transformer windings employing rectangular or so-called pancake coils.

The rectangular or pancake coils of the prior art have conventionally been made with a single conductor per layer; this has resulted in very large single coils. In some designs, single conductor coils up to ninety-six inches wide by one hundred and fifty inches long have been used. It is also a common practice, because of the potential difference between adjacent single turn pancake coils, to mount adjacent pancake coils with graded insulation between them. That is, adjacent pancake coils are mounted closer together near their points of common connection than at portions of the pancake coils remote from the common connection. These practices result in a rather low space factor. Space factor may be defined as the ratio of conductor volume to total winding volume. In addition, the voltage gradient about rectangular pancake coils tends to be concentrated at the corners of the winding and hence these sharp corners constitute a potential point of weakness in the insulation of the winding.

Accordingly, it is a general object of this invention to provide a new and improved transformer winding.

It is a more particular object of this invention to provide a new and improved transformer winding of the rectangular pancake type which has an increased space factor.

A further object of this invention is to provide a means of reducing voltage gradient at the corners of a rectangular pancake winding of general utility but particularly adapted for use with the disclosed winding.

It is yet another object of this invention to provide a rectangular pancake winding in which the cooling ducts are subject to little or no electrical stress.

Briefly, the present invention accomplishes the above cited objects by providing a rectangular pancake winding in which several sub-windings or multi-conductor coils are connected in electrical series. Each of the sub-windings is constructed of a plurality of single conductor rectangular pancake coils connected in electrical parallel. The pancake coils in each sub-winding are mounted in essentially equidistantly spaced relationship. Duct formers may be placed in the spaces of low electrical stress between the parallel connected sub-winding pancake coils. The electrically stressed space between series connected adjacent sub-windings may be filled with a solid insulation such as a built up pressboard. The corners of the sub-windings where the voltage gradient is high are effectively rounded off by connecting electrical conductors or semiconductors having a rounded configuration to the winding near the corners of the sub-windings and covering these conductors or semiconductors with electrical insulation. An envelope of electrical insulation is then placed around the entire winding. Because adjacent pancake coils in each sub-winding are connected in parallel and hence are at the same electrical potential at corresponding points, the need for grading the space between adjacent pancake coils is obviated. Uniform spacing between adjacent pancake coils results in a more compact winding than was possible with the prior art windings employing graded spacing. Fewer brazed joints are required than with series connected pancake coils.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figure 1:
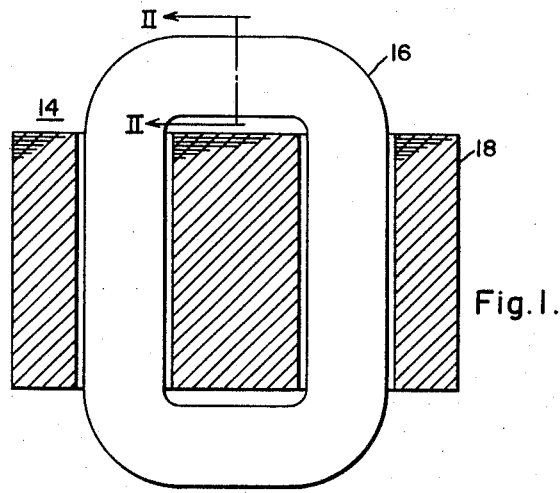
FIGURE 1 is a view partly in elevation and partly in vertical transverse section of a shell form transformer with rectangular pancake coils.

Referring to FIG. 1 there is illustrated a view partly in elevation and partly in section of a shell form transformer 14. The transformer 14 includes a plurality of rectangular pancake windings such as high voltage winding 16 and a shell form ferromagnetic core 18. The term shell form transformer means a transformer in which the core, in general, surrounds the windings. Low voltage windings (not shown) are placed in close proximity to high voltage winding 16.

Figure 2:
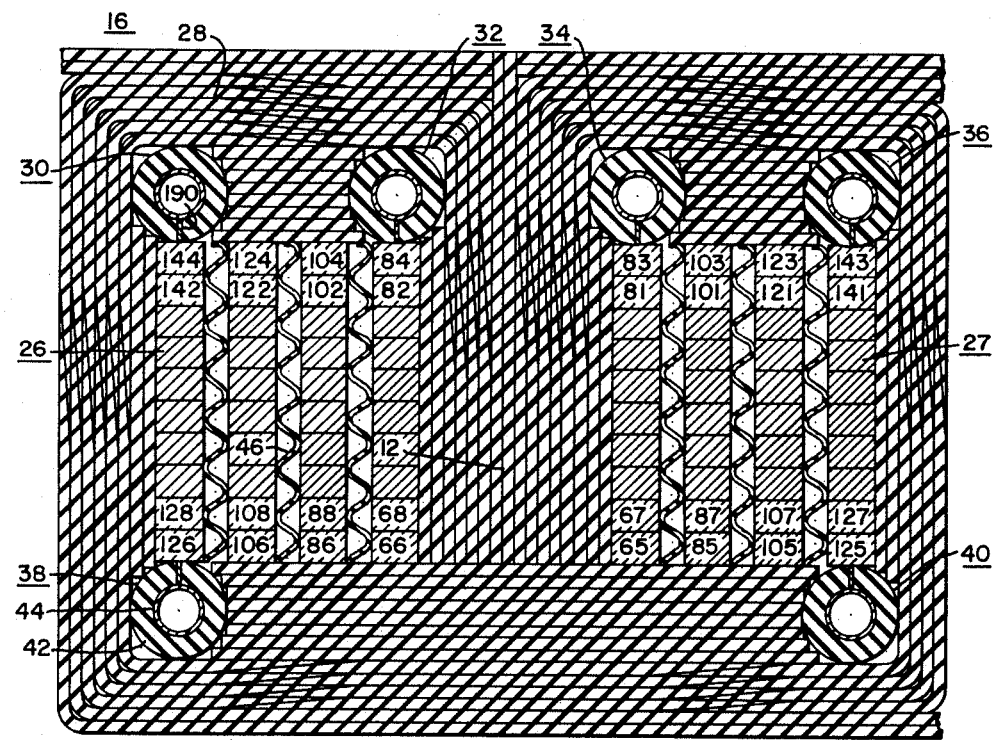
FIG. 2 is a vertical transverse sectional view of a high voltage winding of the transformer of FIG. 1 taken along section II—II.

In FIG. 2 there is shown a vertical transverse sectional view of the high voltage winding 16 of FIG. 1 taken along section II—II. The high voltage winding 16 includes two sub-windings or multi-conductor coils 26 and 27. Two coils are shown, but as many coils may be used as are required to supply the desired voltage and ampere turns. Each of the coils 26 and 27 is shown wound with four parallel connected electrical conductors. For example, the four conductors which comprise coil 26 may be traced starting at a first layer of conductor turns comprising turns 66, 86, 106 and 126 respectively, and spiraling around coil 26 to a second layer of turns, appearing as turns 68, 88, 108 and 128 respectively. Each of the four conductors continue spiraling away from the center of the winding, which though not shown is located below FIG. 2. The conductors continue spiraling outward through coil 26 appearing as the next to the last layer of turns 82, 102, 122 and 142. The four conductors then make one more turn around the coil and appear as conductor turns 84, 104, 124 and 144.

Figure 5:
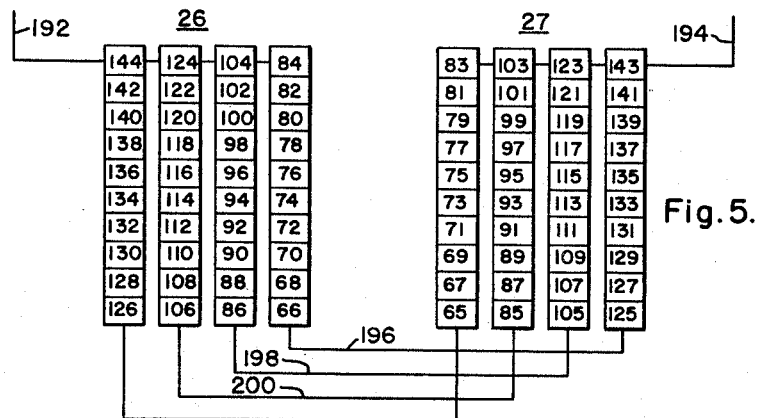
FIG. 5 is a wiring diagram of the high voltage winding of FIG. 2 with parts omitted for clearness.

In like manner, coil 27 includes four layer-wound spiral conductors with innermost conductor turns 65, 85, 105 and 125 respectively. The four conductors spiral upward in the figure appearing at turns 67, 87, 107 and 127 in the next adjacent layer. The conductors continue spiraling upward in the figure appearing as turns 81, 101, 121 and 141 in the next to the last layer of coil 27 and as turns 83, 103, 123 and 143 in the outermost layer. The coils 26 and 27 may be connected in series as shown in FIG. 5, so that the magnetic flux produced by each coil adds to the magnetic flux produced by the other coil.

It will be understood that a plurality of conductors may be connected in parallel in each turn for increased current carrying capacity. Four conductors are shown in each coil or sub-winding, but more or less than that number of conductors may be used.

Duct forms, such as corrugated duct former 46 are placed between adjacent conductors in each coil to allow for circulation of a cooling medium throughout the winding. An advantage of this type of winding is that little or no electrical potential will exist across the duct formers because of the parallel connections of the multi-conductor coils as best seen in FIG. 5. For example, because turns 144, 124, 104 and 84 are connected in electrical parallel, there will be little or no electrical potential between turns 124 and 104 across duct former 46. A similar analysis holds for all the turns which bracket duct former 46. For example, although there will be a large electrical potential difference between turns 124 and 106 or between turns 104 and 86 respectively, there will be little or no electrical potential between turns 86 and 106 because these turns are connected in electrical parallel as best seen in FIG. 5. Therefore, as the duct former 46 is in a zone of little or no electrical potential difference, the material with which the duct former 46 is made does not have to be of exceptionally high dielectric strength. The duct formers, such as duct former 46, may be omitted if other cooling means are used. Coils 26 and 27 are connected in electrical series by a method of interconnection which will be illustrated with reference to FIG. 5. The zone between coils 26 and 27 is required to withstand surge voltages, hence this zone is completely filled with suitable electrical insulation such as interleaved pressboard 12.

It will be noted that as adequate provision is made between the conductors of each coil to provide ventilation with duct formers such as duct former 46, no ventilation is required in the region of dynamic voltage stress between coils 26 and 27. The plurality of conductors connected in parallel have less eddy current losses than would a single conductor of comparable current carrying capacity. The conductors may be transposed, if desired, to reduce circulating currents.

As an electric field tends to concentrate at sharp corners of an electrical winding, it is desirable that provision be made in my new and improved winding to effectively overcome the crowding of the electrical field at right angle corners or edges to prevent weakening of the insulation structure. In the embodiment of my invention shown in FIG. 2, I use metal tubes such as tube 44 or flexible plastic rods coated with an electrically conductive or semiconductive layer as electrostatic shields. I then cover these tubular electric conductors or semiconductors with electrical insulation such as electrical insulation 42. The result of this build-up is voltage gradient reducing members such as voltage gradient reducing member 38. I place voltage gradient reducing members 38, 30, 32, 34, 36 and 40 adjacent to, and parallel with, the corner or edge turns 126, 144, 84, 83, 143 and 107 respectively, of the coils 26 and 27. I then electrically connect the tubular electrical conductor or semiconductor of each of these voltage gradient reducing members to the adjacent turn by electrically conductive means such as strap 190 connected to turn 144. The entire winding is then covered with an envelope of electrical insulation such as interleaved pressboard 28. No voltage gradient reducing members are required adjacent to the turns 66 or 65 as these turns are essentially at the same electrical potential.

Figure 3:
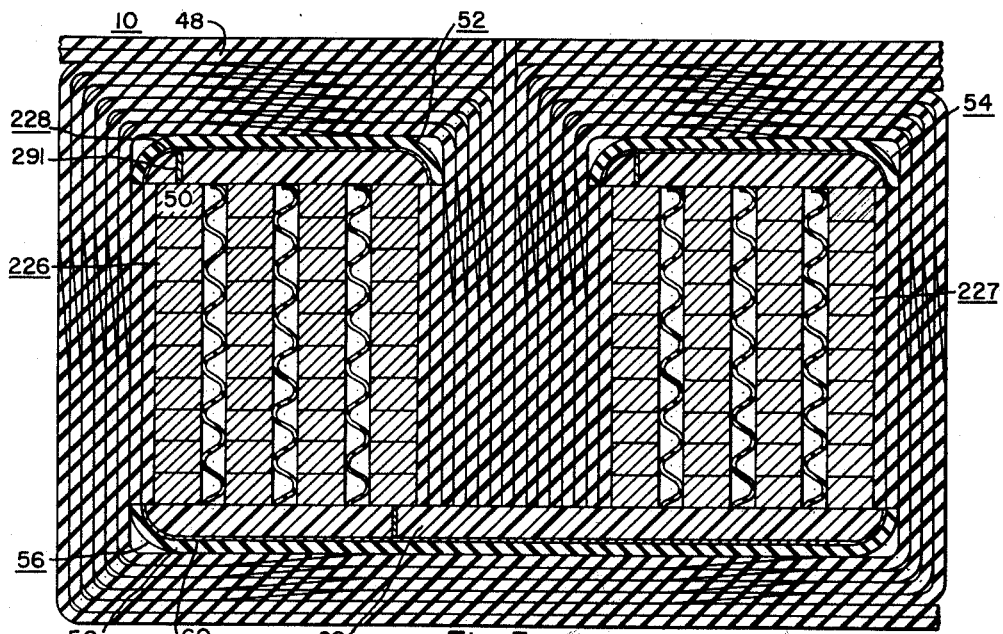
FIG. 3 is a vertical transverse sectional view of another high voltage winding.

One may see at FIG. 3 an alternative embodiment 10 of the invention which uses modified voltage gradient reducing members 52, 54 and 56. The coils 226 and 227 of winding 10 are identical in other respects to the coils 26 and 27, electrical winding 16 of FIG. 2 and hence will not be considered again in detail. The voltage gradient reducing members 52, 54 and 56 used to effectively round off the corners of the winding in this embodiment of the invention are thin electrical conductors such as conductor 60 embedded in electrical insulation 62. The electrical conductor 60 is of a rounded configuration to overcome crowding of the electric field caused by sharp corners of the electrical winding such as the corner formed by conductor turn 50. The voltage gradient reducing member 56 includes a layer of electrical insulation 62 which is placed in contact with coils 226 and 227. Over this electrical insulation 62 is placed the thin concavo-convex electrical conductor 60 with the concavity facing the coils 126 and 127. Another layer of electrical insulation 58 is placed over the electrical conductor 60. Similarly the voltage gradient reducing structures 52 and 54 are also placed in contact with the coils 226 and 227. In each voltage gradient reducing structure the conductor of the voltage gradient reducing structure is connected to a turn of the winding. For example, the electrical conductor 228 in the voltage gradient reducing device 52 is connected to conductor 50 by means of strap 291. An envelope of electrical insulation 48 is then placed around the coils 226 and 227 and the attached voltage gradient reducing devices 52, 54 and 56. The large voltage gradient reducing member 56 is equivalent to the two smaller members 52 and 54.

Figure 4:
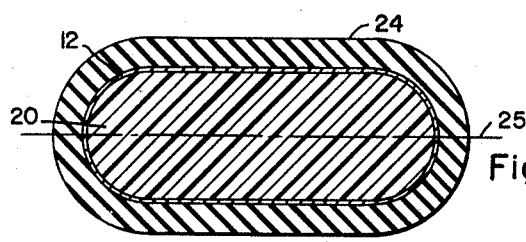
FIG. 4 is a vertical transverse sectional view of a portion of the insulation structure used in FIG. 3 during a stage of manufacture.

There is illustrated in FIG. 4 one way in which the voltage gradient reducing devices used in FIG. 3 may be manufactured. As shown in cross section, a strip of a flexible electrical insulation 20 such as rubber or plastic, having the cross sectional area of a rectangle with the shortest sides rounded convexly, is coated with an electrical conducting material 12. The electrically conductive material 12 may be of a semiconducting nature to prevent the voltage gradient reducing device from carrying excessive circulating current when in place adjacent to a transformer winding. Alternatively, a discontinuity may be introduced in the electrically conductive coating 12 of insulation member 20 to prevent the voltage gradient reducing device from becoming a shorted turn when wrapped around the winding of a transformer. The electrical conducting layer 12 is then covered with electrical insulation such as adhesive coated tape 24. The structure so built up may now be cut lengthwise along centerline 25, to form two voltage gradient reducing devices such as are illustrated at 52 and 54 in FIG. 3.

From the wiring diagram illustrated at FIG. 5, one may see how the multi-layered coils or sub-windings 26 and 27 of FIG. 2 can be connected together in series, connected to an external circuit, or connected to other coils. A line lead 192 enters coil 26 at the outside of the winding and is attached to turns 144, 124, 104 and 84 in common. Each of these turns is an outer turn of the multilayered coil 26. Four parallel connected current paths may now be traced through coil 26. The first path starts at turn 144 and spirals downward in the figure toward the center of the winding (not shown) through turns 142, 140, 138, 136, 134, 132, 130 and 128 to innermost turn 126. The second parallel path starts at turn 124 and spirals toward the center of the coil through turns 122, 120, 118, 116, 114, 112, 110 and 108 to innermost turn 106. The third parallel path starts at turn 104 and spirals downward in the figure through turns 102, 100, 98, 96, 94, 92, 90, 88 to innermost turn 86. The fourth parallel path starts at turn 84 and spirals downward toward the center of the winding through turns 82, 80, 78, 76, 74, 72, 70 and 68 to turn 66 at the inside of the winding. The inside turns 126, 106, 86 and 66 of coil 26 are joined to the inside turns 65, 85, 105 and 125 of coil 27 by connections 202, 200, 198 and 196. The first conducting path of coil 27 starts at turn 65 and spirals upward in FIG. 5 through turns 67, 69, 71, 73, 75, 77, 79 and 81 to turn 83. The second parallel path of coil 27 starts at turn 85 and spirals upward through turns 87, 89, 91, 93, 95, 97, 99 and 101 to outermost turn 103. The third parallel path of coil 27 starts at innermost turn 105 and spirals upward in FIG. 5 through turns 107, 109, 111, 113, 115, 117, 119 and 121 to outermost turn 123. The fourth parallel path of coil 27 starts at turn 125 and spirals upward and outward through coil 27 by means of turns 127, 129, 131, 133, 135, 137, 139 and 141 to turn 143. The outermost turns 83, 103, 123 and 143 of coil 27 are connected together and joined to a line lead 194 which forms the other end of the circuit which began at line lead 192.

Alternatively, the connections between coils may be made at the outside of the winding and the line connections may be made at the inside of the winding.

Because the circuit paths in each coil are connected in parallel, fewer connections are required between the circuit paths than if the circuit paths were connected in series. For example, turns 88, 86, 84 and 82 may be joined with but one strap.

It will, therefore, be apparent that there has been disclosed a winding for electrical transformers which has an improved space factor as well as a novel shielding structure and cooling ducts which are located in zones of little or no electrical stress.

Since numerous changes may be made in the above described apparatus and different embodiments may be made without departing from the spirit thereof, it is intended that all the matter contained in the foregoing description or shown in the accompanying drawings shall be interpreted as illustrative and not in a limiting sense.

I claim as my invention:

A winding for an electrical transformer comprising a plurality of coils disposed in spaced side-by-side relation to form a stack of coils having first and second ends, solid insulation disposed between said coils, each of said coils including a plurality of insulated conductors, each of said conductors being wound into a spiral comprising a plurality of superposed turns to form a single conductor pancake having innermost and outermost turns, duct forming members disposed between each of said pancakes in each of said coils, means connecting each of the pancakes of one coil in series circuit relation with one of the pancakes in the adjacent coils to form a plurality of series circuits through said plurality of coils, said means connecting the innermost turns of each of the pancakes of one coil with the innermost turns of the pancakes in one of the adjacent coils and the outermost turns of the pancakes of each coil to the outermost turns of the pancakes of the other adjacent coil, means connecting the outermost turns of the pancakes of the first end coil together, means connecting the outermost turns of the pancakes of the second end coil together, a plurality of voltage gradient reducing members disposed adjacent the innermost and outermost turns of the pancakes of said plurality of coils, two of said voltage gradient reducing members being disposed adjacent the outermost turns of the end coils, respectively, and each of the remaining voltage gradient reducing members being disposed adjacent the turns of two adjacent coils, said voltage gradient reducing members each including a thin metallic conductive member having a concavo-convex cross section surrounded by solid insulation, each of said voltage gradient reducing members being disposed with their concave portion facing the turns of the coils, said metallic conductive member in each of said voltage gradient reducing members being electrically connected to one of the turns of the pancakes it is adjacent to.

References Cited by the Examiner
UNITED STATES PATENTS

| | | | |
|---|---|---|---|
| 1,585,448 | 5/26 | Weed | 336—70 |
| 2,251,373 | 8/41 | Olsson | 336—70 |
| 2,279,028 | 4/42 | Weed | 336—70 |
| 2,295,371 | 9/42 | Vogel | 336—180 |
| 2,942,215 | 6/60 | Bennon et al. | 336—70 |
| 2,993,183 | 7/61 | Moore et al. | 336—70 |

FOREIGN PATENTS

| | | |
|---|---|---|
| 333,785 | 3/21 | Germany. |

JOHN F. BURNS, *Primary Examiner.*